United States Patent [19]

Sanada et al.

[11] 4,307,626

[45] Dec. 29, 1981

[54] DEVICE FOR ADJUSTING AN INCLINATION ANGLE OF A TILT HANDLE IN A VEHICLE

[75] Inventors: Yuichi Sanada, Kawasaki; Satoshi Kinoshita, Shizuoka; Akio Kamoshita, Yokohama, all of Japan

[73] Assignees: Nissan Motor Company; Fuji Kiko Kabushiki Kaisha, both of Japan

[21] Appl. No.: 80,435

[22] Filed: Oct. 1, 1979

[30] Foreign Application Priority Data

Oct. 11, 1978 [JP] Japan ............................ 53-124968

[51] Int. Cl.³ .......................... B62D 1/18; G05G 5/16
[52] U.S. Cl. ........................................ 74/493; 74/531; 248/292.1; 248/299; 267/155; 403/120
[58] Field of Search .............. 74/493, 531; 248/292.1, 248/299; 267/155; 403/120

[56] References Cited

U.S. PATENT DOCUMENTS

| 2,742,662 | 4/1956 | Lyons ............................ 267/155 X |
| 3,170,711 | 2/1965 | Dunifon et al. .................. 74/493 X |
| 3,299,733 | 1/1967 | Felts et al. ............................ 74/493 |
| 3,548,675 | 12/1970 | Grimes et al. ........................ 74/493 |
| 3,718,053 | 2/1973 | Cinadr ................................. 74/493 |
| 3,799,569 | 3/1974 | Baker ................................. 74/493 X |
| 3,803,939 | 4/1974 | Schenten ........................ 248/299 X |

FOREIGN PATENT DOCUMENTS

| 662667 | 5/1963 | Canada ............................ 248/292.1 |
| 1058878 | 2/1967 | United Kingdom . |
| 1153225 | 5/1969 | United Kingdom . |
| 1287269 | 8/1972 | United Kingdom . |

Primary Examiner—Allan D. Herrmann
Attorney, Agent, or Firm—Thompson, Birch, Gauthier & Samuels

[57] ABSTRACT

In a tilt handle, including a steering shaft, supported by a sleeve the lower end of which is pivotably provided so as to adjust an inclination angle of the tilt handle with relation to a car body, a device for adjusting the inclination angle of the tilt handle includes a stationary bracket, a movable bracket and spring means therebetween, the stationary bracket being positioned at a proper portion of the car body. The movable bracket is located at a suitable portion of the sleeve and is movable within the stationary bracket. The spring means is provided for energizing the sleeve to move upwardly.

4 Claims, 16 Drawing Figures

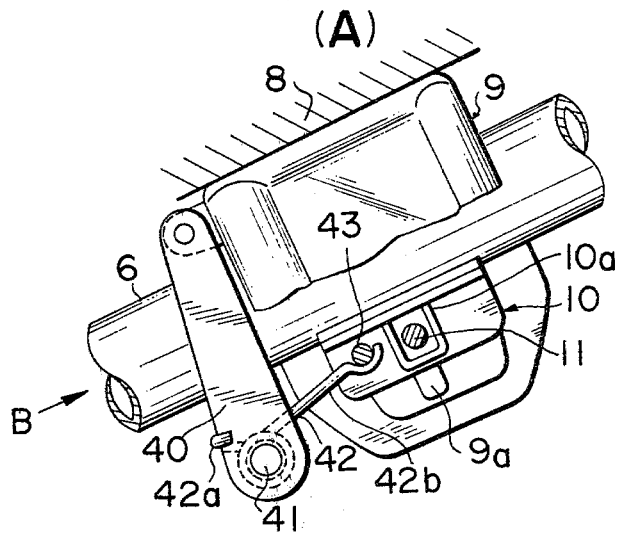
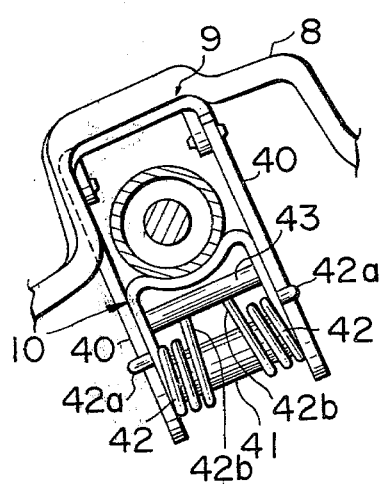

DEVICE FOR ADJUSTING AN INCLINATION ANGLE OF A TILT HANDLE IN A VEHICLE

BACKGROUND OF THE INVENTION

The present invention relates to a tilt handle in which a position of a steering wheel may be adjusted so as to conform to the contour of the body of a driver and in particular relates, to a device for making it easy to adjust the inclination angle of the tilt handle.

In the prior art tilt handle, the inclination angle of a steering shaft is adjusted in a vertical direction by an adjusting mechanism to change the position of a steering wheel thereby properly positioning the steering wheel, to conform to the contour of the body of the driver. For example, as can be seen in FIG. 1, such a type of tilt handle includes a steering shaft 1, one end of which is joined to a steering wheel 2 and the other end of which is connected through a universal joint 3 to a joint shaft 5 for a steering gear box 4 or to the gear box 4 directly. A sleeve 6 rotatably supports the steering shaft 1 by a ball bearing or a bush (not shown). The sleeve 6 is fixed at its relatively upper portion through a device for adjusting an inclination angle of the steering shaft. In the prior art adjusting device as above-mentioned, however, when the fastening of the bracket is loosened by the adjusting lever, the sleeve 6 and other portions relative thereto are apt to incline downwards due to the fact that the steering shaft and the sleeve are not supported by any means. Accordingly, it is necessary that the driver holds the steering wheel to support same, when the tilt handle inclination is adjusted to a desired angle, until the lever is clamped in a desired position. Due to the sleeve and other portions relative thereto being very heavy, operation thereof requires some amount of force and becomes troublesome.

SUMMARY OF THE INVENTION

Therefore, it is an object of the present invention to provide a device for adjusting an inclination angle of a tilt handle in which the defects of the prior art adjusting device as above-mentioned can be overcome.

It is another object of the present invention to provide a device for adjusting an inclination angle of a tilt handle in which spring means are provided between a stationary bracket and a movable bracket so as to upwardly energize the movable bracket so that when both fastened brackets are loosened by means of an adjusting mechanism, the sleeve and other portions relative thereto do not incline downwards whereby the inclination angle of the handle can be easily and smoothly adjusted even if a minor force is applied.

BRIEF DESCRIPTION OF THE DRAWINGS

These and other objects, features and advantages of the present invention will become more apparent from the following description of embodiments of the present invention taken in conjunction with the accompanying drawings in which:

FIG. 11A is a side view, partly broken away, illustrating a device according to still yet further embodiment of the present invention; and FIG. 11B is a view, partly in section, taken in the direction of the arrow B in FIG. 11A.

DETAILED DESCRIPTION OF THE PREFERRED EMBODIMENTS

Figure 2:
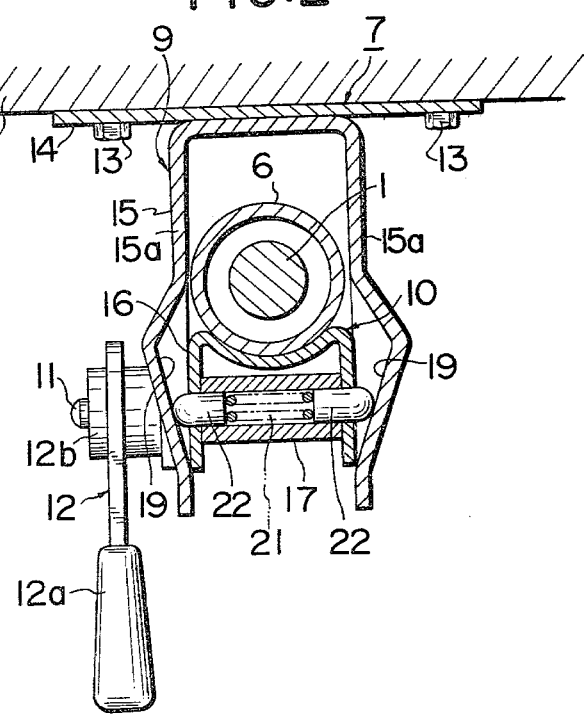
FIG. 2 is a sectional view illustrating a device for adjusting an inclination angle of the handle according to a preferred embodiment of the invention, showing a portion corresponding to that taken along the line II—II in FIG. 1.
Figure 3:
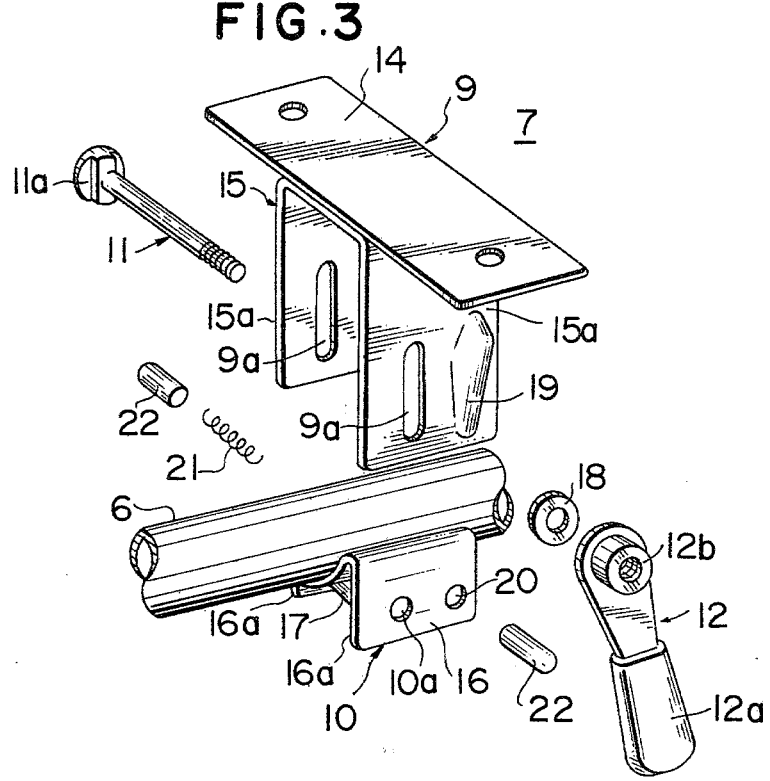
FIG. 3 is an exploded perspective view of the device shown in FIG. 2.

Referring now to FIGS. 2 and 3, there is shown a device 7 for adjusting an inclination angle of a tilt handle in which spring means is provided in order to energize a sleeve and other portions relative thereto to move upwards. A steering shaft 1 and a sleeve 6 are arranged in a conventional manner. The adjusting device 7 includes a stationary bracket 9 and a movable bracket 10.

The stationary bracket 9 of the adjusting device 7 comprises a plate-like fitting member 14 fixed to the car body 8 by bolts 13 and a channel-shaped bracket body 15 fixed on a central portion of the fitting member 14 by means of welding or the like. The bracket body 15 is provided with a pair of slots 9a, 9a formed in a vertical direction on the side walls of the bracket body 15. The movable bracket 10 includes a bracket body 16 fixed to the sleeve 6 which is provided between both side walls 15a, 15a of the channel-shaped bracket body 15. If desired, a reinforcing member 17 can be provided for connection with the movable bracket 10. The bracket body 16 has a through hole 10a formed through both its side walls 16a, 16a, respectively. A fastening bolt 11 is inserted through slots 9a, 9a and through holes 10a, 10a. Screwed onto the tip of the fastening bolt 11 is the tapped hole of the head 12b of an adjusting lever 12 having an operating handle 12a fixed thereto. By the revolving motion of the lever 12, the movable bracket 10 and the stationary bracket 9 are selectively fastened or loosened to and from each other. The fastening bolt 11 has at the reverse side of its head, parallel surfaces 11a in tiers which are adapted to engage with the slot 9a. Numeral 18 designates a washer which is placed over the bolt 11, for reinforcement, prior to screwing the head 12b thereon.

A pair of grooves or recesses 19 are formed in a tapered form on the inner surface of each of the side walls 15a, 15a of the bracket body 15 of the stationary bracket 9. The central portion of grooves 19 is formed deeper so as to have a tapered configuration, and narrowing downwardly in width to each other. Corresponding to the tapered grooves 19, a through hole 20 is laterally formed through the reinforcing member 17 and the side walls 16a of the bracket body 16 of the movable bracket 10. A compression coil-shaped spring 21 is provided between a pair of bullet-shaped-sliders 22 to energize the tip of the sliders 22 against the bottom surface of grooves 19.

According to such construction, when the adjusting lever 12 is revolved in a given direction, the lever 12 is screwably moved along the bolt 11 thereby fastening the movable bracket 10 in combination with both side walls 15a of the stationary bracket 9. As a result, the sleeve 6 and other relevant members are integrally fastened to the movable bracket 10 and the stationary bracket 9. On the contrary, when the lever 12 is revolved in the opposite direction, the fastening of the brackets is loosened so that the movable bracket 10 becomes freely movable with relation to the stationary bracket 9. At that time, the energizing force of the spring 21 produces the friction between the sliders 22 and the tapered surfaces of the tapered grooves 19 to prevent the jacket 6 and other relevant members from inclining downwards, although they are likely to incline downwards by their own weight in the prior art device as explained heretofore. Finally, the sleeve and other relevant members stop in a balanced position of angle inclination where the energizing force of the spring 21 is equal to the weight of the sleeve and the friction force of the sliders 22 against the grooves 19. Accordingly, even if a minor force is applied to the sleeve 6, the sleeve 6 can move up or down smoothly so as to adjust the height of the steering wheel with only a slight amount of force.

Figure 1:
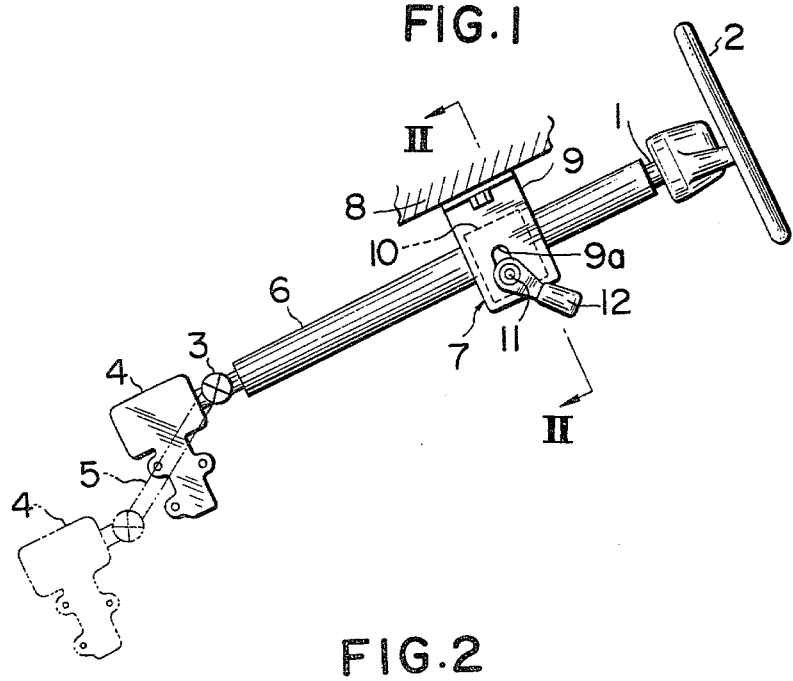
FIG. 1 is a schematic side view of a tilt handle provided with a typical device for adjusting an inclination angle of the handle as stated above.
Figure 4:
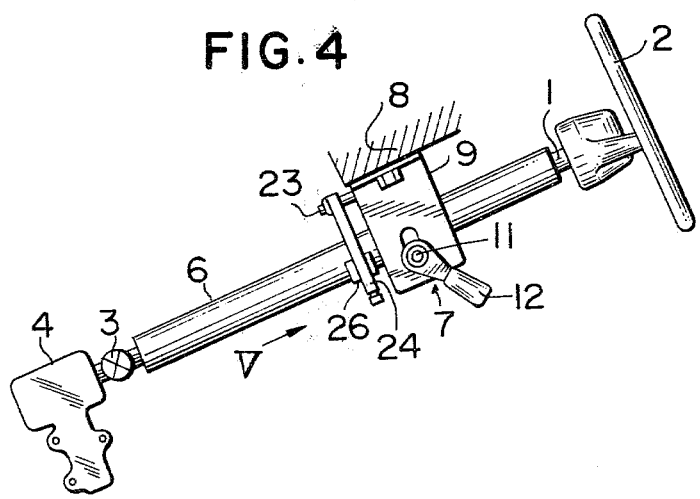
FIG. 4 is a schematic side view illustrating a tilt handle equipped with a device for adjusting an inclination angle of the handle according to another embodiment of the present invention.
Figure 5:
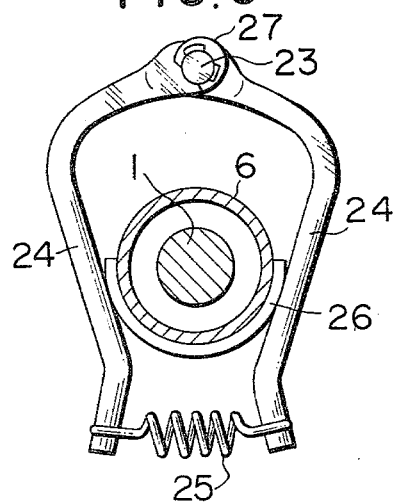
FIG. 5 is a view, partly in section, taken in the direction of the arrow V in FIG. 4.
Figure 6:
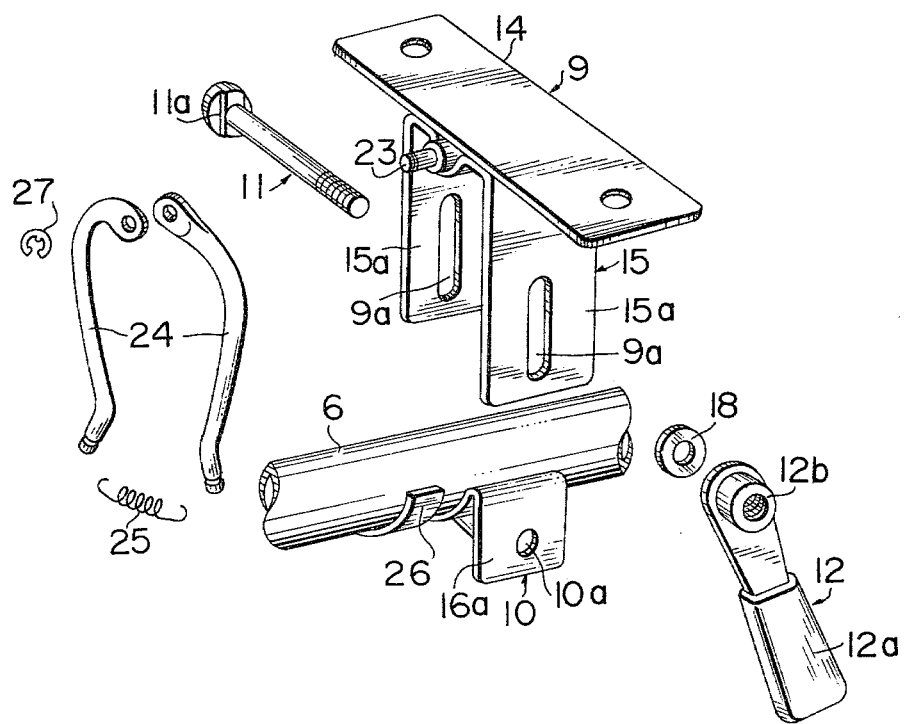
FIG. 6 is an exploded perspective view showing a part of the device as shown in FIG. 4.
Figure 7:
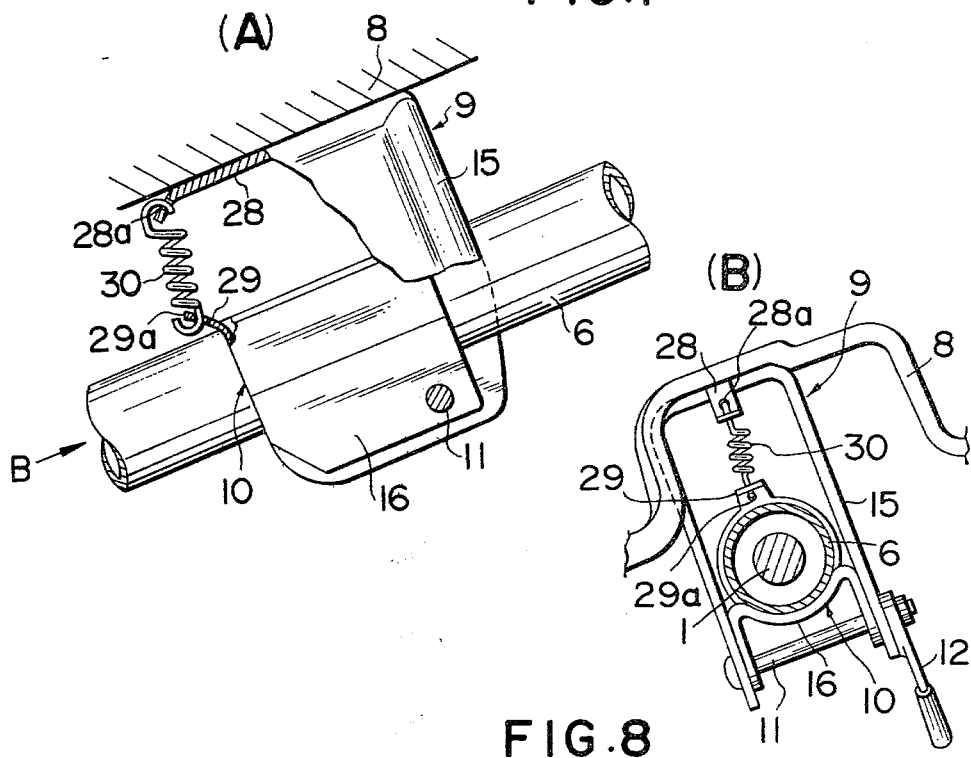
FIG. 7A is a side view, partly broken away, of a device according to still another embodiment of the present invention.
FIG. 7B is a view, partly in section, taken in the direction of the arrow B in FIG. 7A.
Figure 8:
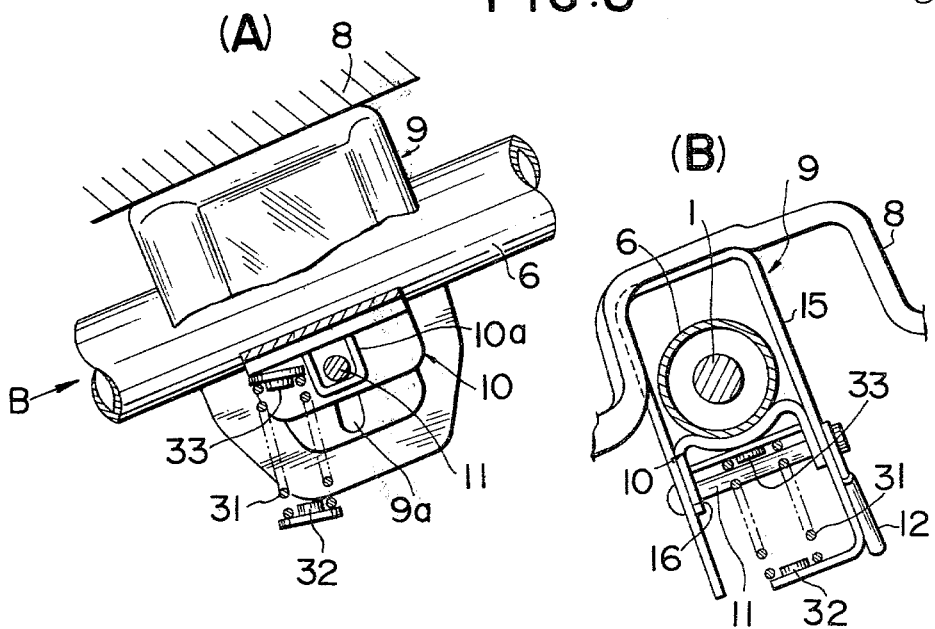
FIG. 8A is a side view, partly broken away, of a device according to still yet another embodiment of the present invention.
FIG. 8B is a view, partly in section, taken in the direction of the arrow B in FIG. 8A.
Figure 9:
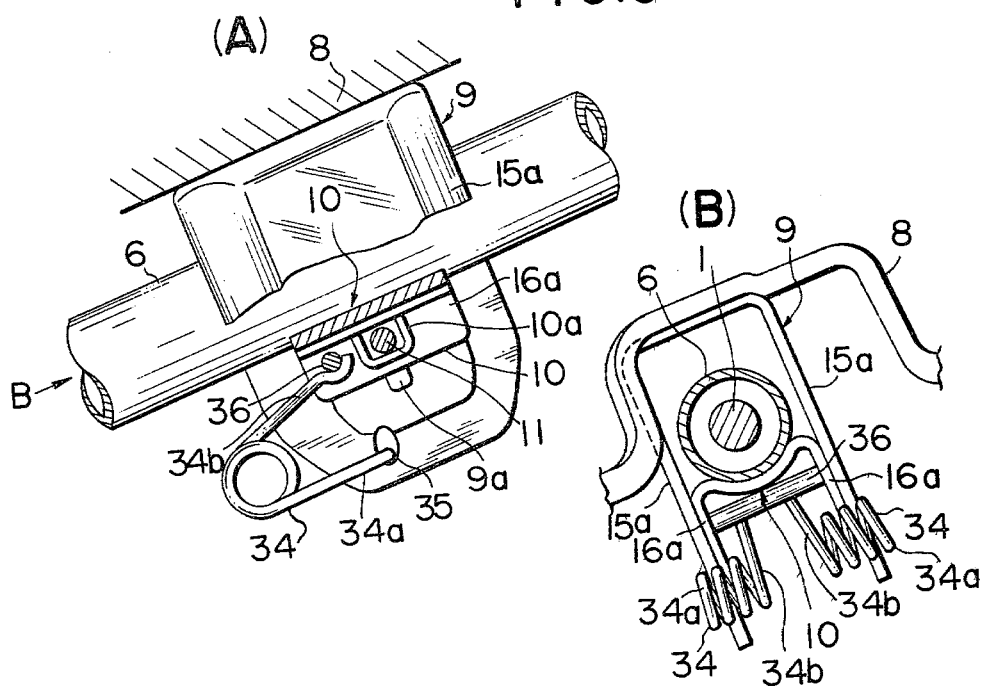
FIG. 9A is a side view, partly broken away, illustrating a device for adjusting an inclination angle of a tilt handle according to further embodiment of the present invention.
FIG. 9B is a view, partly in section, taken in the direction of the arrow B in FIG. 9A.
Figure 10:
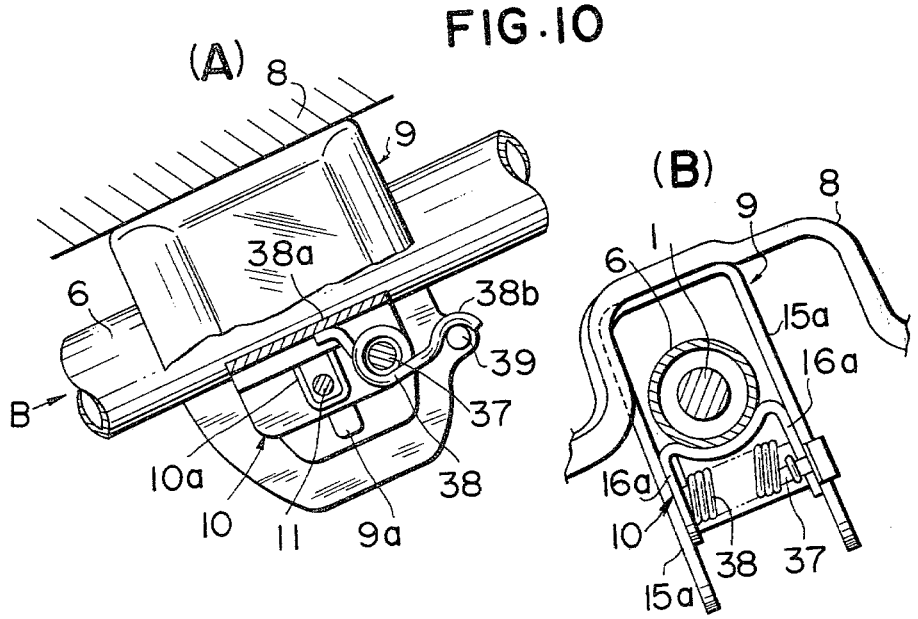
FIG. 10A is a side view, partly broken away, showing a device according to still further embodiment of the present invention.
FIG. 10B is a view, partly in section, taken in the direction of the arrow B in FIG. 10A.

FIGS. 4 through 6 illustrate another embodiment of the present invention in which the same or corresponding members are designated by the same reference numerals as those in the embodiment as shown in FIGS. 2 and 3 or in the prior art device as shown in FIG. 1. In this embodiment, a pivot pin 23 is provided between the fitting member 14 of the stationary bracket 9 and the bracket body 15, slightly projecting from same at its ends. A pair of arms 24 is rotatably joined by the pivot pin 23. Each of the arms 24 has a contact portion widening upwardly by which the sleeve 6 is held. That is to say, the contact portions of the arms 24 resiliently hold the outer surface of the sleeve 6 by the energizing force of a tension spring 25 provided at the lower portion of the arms 24. A U-shaped slider 26 is fixed to the sleeve 6 at the position corresponding to the contact portion of the arms 24. A snap ring is denoted by 27 to movably hold the arms 24.

According to the present embodiment as above-mentioned, each arm 24 elastically holds the sleeve 6 through the slider 26 at the contact portion thereof with a force corresponding to the energizing force of the spring 25 being applied thereto. As a result, the sleeve 6 is stopped in a balanced position by the friction force therebetween. Accordingly, even if a minor force is applied to the sleeve 6 and other relevant members, they can easily move in a desired direction for adjusting the inclination angle of the tilt handle.

FIGS. 7 through 11 illustrate still another embodiments of the present invention wherein the force of the spring means 30, 31, 34, 38, 42 is directly applied to the movable bracket 10 so as to energize the sleeve 6 and other relevant members to move upwardly. The movable bracket 10, the stationary bracket 9, the fastening or loosening mechanism by the fastening bolt 11 and the movable lever 12 are substantially identical to those as previously stated. The same parts or members are designated by the same reference numerals therebetween, not described hereinafter.

In an embodiment as illustrated in FIGS. 7A and 7B, a tension spring 30 is connected at both ends thereof to a hole 28a of a projection 28 arranged on the stationary bracket 9 and a hole 29a of a projection 29 provided on the movable bracket 10. The spring 30 resiliently suspends the sleeve 6 and other relevant members so as to prevent same from inclining excessively downwards when the lever 12 becomes loosened. The sleeve 6 and other relevant members stop in a position where the force of the spring 30 and the weight of the sleeve 6 and other relevant members are in balance. As a result, the inclination angle of the tilt handle can be lightly adjusted. Further, if necessary, the upper end of the spring 30 can be fixed to a portion of the car body.

FIGS. 8A and 8B illustrate still yet another embodiment of the present invention wherein a compression coil-shaped spring 31 is used in place of the tension spring 30. The spring 31 is provided through spring seats 32 and 33 between the lower end of the stationary bracket 9 and the lower end of the movable bracket 10. A reinforcing member 10a is fixed to the movable bracket 10 by means of welding. The operation of the sleeve 6 and other relevant members is substantially identical to that of the embodiment as shown in FIGS. 7A and 7B.

FIGS. 9A and 9B show further embodiment of the present invention in which a pair of torsion springs 34 are used as the spring means, being separate from each other or being formed in series. One end of each torsion spring 34 is engaged with a slot 35 formed on the both side walls 15a of the stationary bracket 9 while the other end of the torsion spring 34 is in contact with the lower portion of a rod 36, the ends of which are supported by both side walls 16a of the movable bracket 10, thereby energizing the sleeve 6 and other relevant members to move upwardly.

FIGS. 10A and 10B illustrate another embodiment of the present invention wherein a torsion spring is also used in a different form. A torsion spring 38 winds on a rod 37 provided on both side walls 16a of the movable bracket 10 for the stable fitting of the torsion spring 38. One end 38a of the torsion spring 38 is supported on the under surface of the movable bracket 10 while the other end 38b thereof is supported by a pin or rod 39 or the like provided on the stationary bracket 9. It is evident that the sleeve 6 and other relevant members may be energized to move upwards by the above-mentioned mechanism.

In an embodiment of the present invention as illustrated in FIGS. 11A and 11B, a pair of plate-like arms 40 are fixed on the stationary bracket 9. A shaft 41 is provided between the lower ends of the arms 40. A apir of separate or integral torsion springs 42 are wound around the shaft 41. Each outer end 42a of the torsion springs 42 abuts on the side edge of the arms 40. Each inner end 42b of the torsion springs abuts on a rod 43 laterally provided at the movable bracket 10. The operation of this embodiment of the present invention is not described because it is similar to the embodiments as previously described.

Needless to say, spring means and relevant means thereof can be used in other different forms or details in addition to those in the embodiments as above-mentioned.

As can be seen from the foregoing, according to the present invention, a device for adjusting an inclination angle of the tilt handle includes spring means between the stationary bracket fixed in relation to the car body and the movable bracket provided at the side of the sleeve, the latter being movable within the former whereby the spring means energizes the sleeve to move upwardly. Consequently, when the device is in a loosened condition so as to adjust the inclination angle of the handle, such prevents the sleeve and other relevant members from excessive inclination so that same can be maintained in a balanced position. Thus, the inclination angle of the tilt handle can be lightly adjusted even if a weak force is applied to move the sleeve and other relevant members up or down.

While the preferred embodiments of the present invention have been described using specific terms, such is only for illustrative purpose and it should be noted that these and other changes and details can be made without departing from the spirit and scope of the present invention.

What we claim is:

1. In a tilt handle for a vehicle, including a steering shaft, a steering wheel connected to the upper end of said steering shaft, a sleeve supporting said steering shaft, the lower end portion of said sleeve being pivotably provided so as to adjust the inclination angle of said tilt handle relative to the body of said vehicle, and means for locking said sleeve and said steering shaft in a desired position,
   a device for adjusting the inclination angle of the tilt handle, comprising:
   a stationary bracket fixed relative to the vehicle body;
   a movable bracket attached to said sleeve such that said movable bracket can move with said steering shaft with respect to said stationary bracket when the inclination angle of said tilt handle is adjusted; and
   spring means disposed between said stationary bracket and said movable bracket for biasing said movable bracket upwardly against the combined weight of said steering wheel, said steering shaft and said sleeve, the biasing force of said spring means being selected such that, when said locking means is in a released condition said steering shaft and said sleeve can stop at any desired angle or position within a limited range due to the balancing of the biasing force of said spring means with frictional resistance and the combined weight of said steering shaft, said steering wheel and said sleeve but can be adjusted upwardly or downwardly by applying an external force to said steering wheel in a desired direction.

2. A device for adjusting the inclination angle of a tilt handle according to claim 1, wherein said spring means includes a torsion spring provided directly between said stationary and movable brackets.

3. In a tilt handle for a vehicle, including a steering shaft, a steering wheel connected to the upper end of said steering shaft, a sleeve supporting said steering shaft, the lower end portion of said sleeve being pivotably provided so as to adjust the inclination angle of said tilt handle relative to the body of said vehicle, and means for locking said sleeve and said steering shaft in a desired position,
   a device for adjusting the inclination angle of the tilt handle, comprising:
   a stationary bracket fixed relative to the vehicle body, said stationary bracket having side wall means;
   a movable bracket having side wall means in slidable engagement with the side wall means of said stationary bracket with frictional resistance therebetween;
   torsion spring means disposed between said stationary bracket and said movable bracket for biasing said movable bracket upwardly, the biasing force of said spring means being selected such that, when said locking means is in a released condition, said steering shaft and said sleeve can stop at any desired angle or position within a limited range due to the balancing of the biasing force of said spring means with the combined weight of said steering shaft, steering wheel, sleeve and movable bracket, and the frictional resistance between the side wall means of said stationary and movable brackets, but can be adjusted upwardly or downwardly by applying an external force to said steering wheel in a desired direction.

4. In a motor vehicle having a steering assembly including a tubular sleeve through which extends a steering shaft with a steering wheel mounted at its upper end, said steering assembly being pivotally adjustable in a vertical plane relative to the vehicle body between uppermost and lowermost positions, the improvement comprising:
   a first bracket fixed to said vehicle body;
   a second bracket fixed to said sleeve, said second bracket being connected to said first bracket for movement in relation thereto with said steering assembly between said uppermost and lowermost positions;
   torsion spring means acting between said first and second brackets to resiliently support said steering assembly at a balanced intermediate position between said uppermost and lowermost positions; and
   clamping means for releasably fixing said second bracket relative to said first bracket.

* * * * *